Sept. 26, 1967  M. M. MOULDER  3,343,918
DISSOLVER CONTAINER HAVING FLANGES AT BOTH ENDS TO
PROTECT THREADED HOSE COUPLINGS
Filed April 16, 1964  2 Sheets-Sheet 2
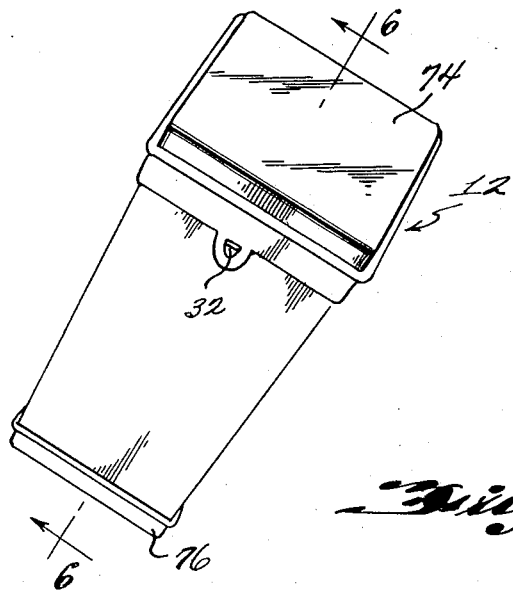
Fig. 5
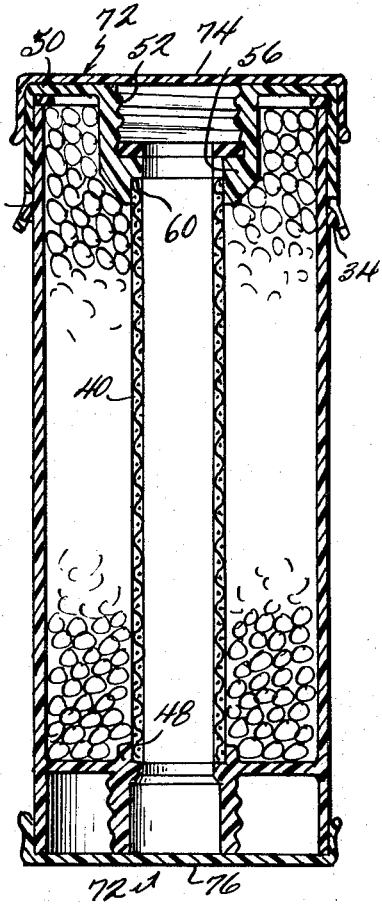
Fig. 6
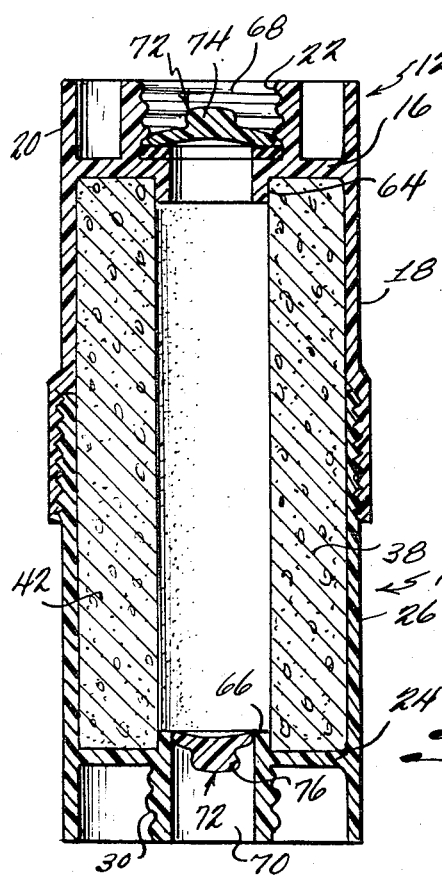
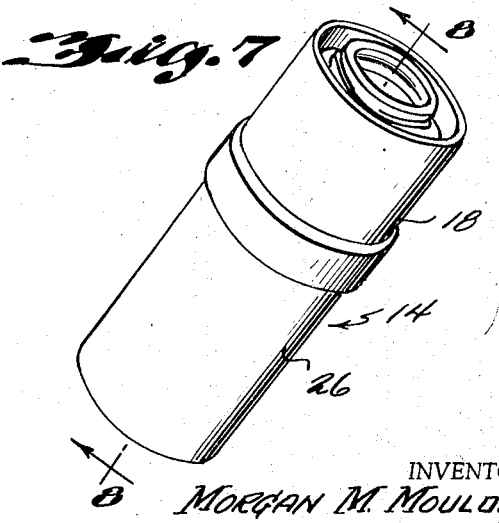
Fig. 7
Fig. 8
INVENTOR
MORGAN M. MOULDER
BY Cushman, Darby & Cushman
ATTORNEYS United States Patent Office 3,343,918
Patented Sept. 26, 1967

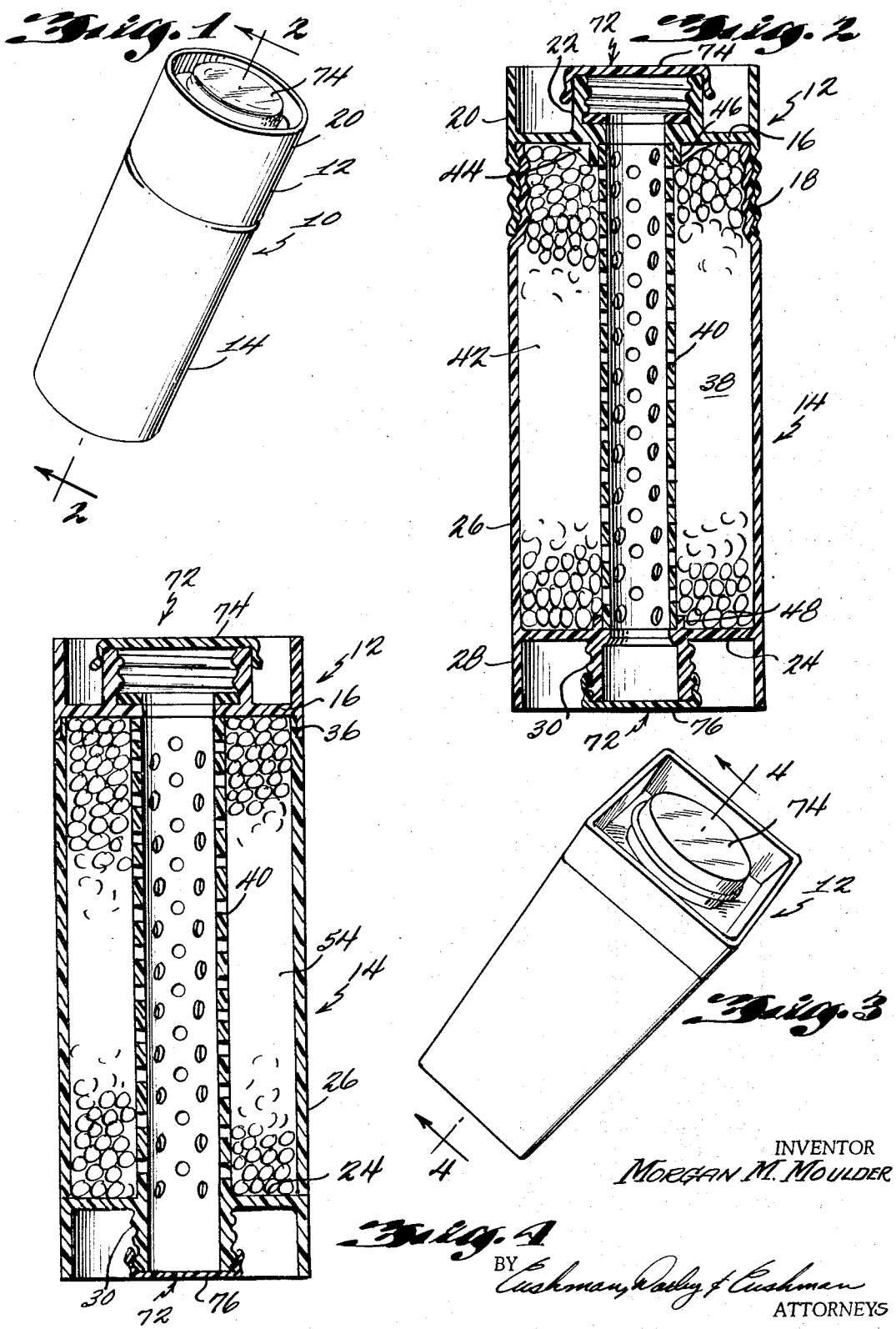

3,343,918
DISSOLVER CONTAINER HAVING FLANGES AT BOTH ENDS TO PROTECT THREADED HOSE COUPLINGS
Morgan M. Moulder, White Bldg.,
Camdenton, Mo. 65020
Filed Apr. 16, 1964, Ser. No. 360,380
3 Claims. (Cl. 23—267)

This invention relates to a container adapted for connection with an ordinary garden hose. More particularly the invention relates to a container provided with water-soluble discrete particles such as fertilizers, disinfectants, insecticides, weed and crabgrass killers, etc. for application on lawns and gardens when the container is interposed between the hose and the nozzle and passage of water therethrough causes dissolution of the discrete particles and spraying of the resulting solution onto the grass or vegetation to be treated.

Spray devices of this general description have been known but the present invention embodies certain novel concepts which are advantageous and which provide a container commercially more attractive. The container according to the instant invention can be made inexpensively for single or repeated use with or without the water-soluble discrete particle treatment material pre-installed in it. Further, the instant invention because of its novel construction provides a container which can more easily be shipped, stored and displayed than other devices of the same general description, thus effecting substantial savings in the cost thereof to the ultimate consumer.

It is therefore an object of the present invention to provide a container which is easily transportable and storable.

Another object of the invention is to provide a reusable or disposable cylindrical container containing a perforated tube axially disposed with the container which provides an annular chamber to hold a water-soluble discrete particle treatment material.

A further object of this invention is to provide a container that comprises generally a cylindrical body member provided with a concentric axially disposed perforated tube in alignment and in communication with an inlet and outlet means, the body member with the tube providing an annular chamber to retain water-soluble discrete particle treatment material and the body member comprising a forward and rearward portions which can alternatively be removably or fixedly attached to provide a reusable or disposable unit, respectively.

Still further objects, advantages and novel features of this invention will become apparent in the following description and claims, taken with the accompanying drawings wherein:

FIGURE 1 is a perspective view of one embodiment of the instant invention;

FIGURE 2 is a cross-sectional view of the container taken on line 2—2 of FIGURE 1;

FIGURE 3 is a perspective view of another embodiment of the invention;

FIGURE 4 is a cross-sectional view of the container taken along line 4—4 of FIGURE 3;

FIGURE 5 is a perspective of yet another embodiment of the invention;

FIGURE 6 is a cross-sectional view taken along the line 6—6 of FIGURE 5;

FIGURE 7 is a perspective view of a still another container made according to the invention; and FIGURE 8 is a cross-sectional view taken along the line 8—8 of FIGURE 7.

As illustrated in these figures, the reference numeral 10 designates the body member of the container which as shown can have any desired shape in cross-section, for instance, circular or rectangular. The body member 10 generally is provided with a forward portion 12 and a rearward portion 14. The forward portion 12 comprises a plate 16 transverse to the longitudinal axis of the body member 10 and provided with a radially outer inwardly extending flange 18, a radially outer outwardly extending circumferential flange 20 and a radially inner outwardly extending inlet 22 concentric with said circumferential flange 20, said inlet providing coupling means for the device with a hose. The rearward portion 14 comprises plate 24 disposed transversely to the longitudinal axis of the body member 10 and provided with a radially outer inwardly extending flange 26, a radially outer outwardly extending circumferential flange 28 and a radially inner outwardly extending outlet means 30 concentric with said circumferential flange 28, said outlet also providing coupling means with a hose.

In one embodiment the flange 18 of the forward portion 12 can be internally threaded to removably receive an externally threaded flange 26 of rearward portion 14 to provide a reusable container. In another embodiment the flange 18 of forward portion 12 can be provided with other conventional securing means such as slot means 32 to removably engage tab means 34 provided on flange 26 of rearward portion 14 of the body member 10 as shown in FIGURES 5 and 6.

In yet another embodiment, the flange 26 of the rearward portion 14 can be provided with a shoulder 36 complemental to a radially outer inwardly directed flange 18 of the forward portion 12. Thereafter the rearward and forward portions can be fixedly attached to each other, as by spin-welding, heat-sealing or any other conventional means.

The rearward and forward portions of the body member when in cooperative engagement with each other provide a chamber 38 in communicaiton with inlet means 22 and outlet means 30. Axially aligned within chamber 38 is, preferably, a perforated tube or screen 40 to provide an annular chamber 42. In one embodiment the tube 40 is supported by spider-shaped brace or bracket means 44 adjacent the inlet means 22. Similar support means can be provided adjacent the outlet means 30. The perforated tube or screen 40 can alternatively be maintained in axial alignment with inlet and outlet means by an axially inner inwardly directed flange means 46 and 48 integral with plates 16 and 24 respectively, as best shown in FIGURE 2.

However, as a modification of the container shown in FIGURE 2, as shown in FIGURE 6, the forward inlet portion 12 can comprise a plate 50 transverse to the longitudinal axis of the body member 10 and integrally provided with a radially inner inwardly extending inlet means 52 comprising internally threaded coupling means 74 and frusto-conical terminal portion 56 which is internally flanged as shown at 58 to provide a shoulder 60 to support perforated tube or screen 40. The support means for perforated tube or screen 40 provided adjacent the outlet means 30 can be essentially that described above i.e., a spider-shaped brace or bracket means 44 or an axially inner inwardly directed flange means 48 integral with plate 24 as shown in FIGURE 2.

In yet another embodiment, as best shown in FIGURE 4, the perforated tube or screen 40 can be made integral with the axially inner inwardly directed flange means 62 integral with the plate 24 adjacent the outlet means 30. In this embodiment, no support means are necessary since the terminal portion of the tube 40 is in abutting relationship with the plate 16 of the forward portion 12 which is fixedly attached to the rearward portion 14 to provide a disposable unit. In this embodiment the radially inwardly extending flange 26 together with the concentrically disposed tube 40 form annular chamber 54 which is provided, prior to fixedly attaching the forward and rearward portion, with water-soluble discrete particle treatment material.

A further embodiment of the invention is shown in FIGURES 7 and 8 wherein the perforated tube or screen 40 can be eliminated, if desired. In this instance, the water-soluble treatment material is in the form of a hollow cylinder and is supported in place by the radially inner inwardly directed flanges 64 and 66 provided on plates 16 and 24.

As shown the radially inner outwardly extending inlet and outlet means 22 and 30 are internally and externally threaded, respectively, to provide hose coupling means 68 and 70, respectively. Removably attached to the coupling means 68 and 70 are closure members 73 whose transverse outer surfaces 74 and 76 lie in a plane subjacent or coincidental with a plane formed by the transverse peripheral surface of the radially outer outwardly extending circumferential flanges 20 and 28. The container of this invention is particularly advantageous in that, because the transverse outer surfaces 74 and 76 of closure members 72 are either coplanar with or subjacent to the transverse surfaces of the radially outer outwardly extending circumferential flanges 20 and 28, more containers can be transported in a given space than devices of the same general description known heretofore.

The container is prepared for use by removing the closure members 72 and coupling the device into the hose line by screwing the inlet coupling 68 into the hose coupling 78 and screwing the outlet coupling 70 into the coupling 80 of a conventional spray nozzle. When the flow of water is properly established through the hose, the passage of water through the body of the container will dissolve the water-soluble treating material contained therein so that the desired solution will be discharged from the nozzle.

While the invention has been described in its preferred embodiment, there will be various modifications apparent to those skilled in the art, which modifications are considered to be within the scope of the appended claims.

What is claimed is:
1. A container adapted for connection with ordinary garden hose comprising: a cylindrical body member defining a chamber; said body member comprising a forward and rearward portion; said forward portion comprising a first plate substantially transversely disposed to the longitudinal axis of said body member and having a first radially outer inwardly extending flange member; a first radially outer outwardly extending circumferential flange member; a radially inner outwardly extending inlet means; said inlet means being internally threaded to provide a first hose coupling means, said first circumferential flange member extending outwardly from said first plate a distance at least equal the outward extent of said inlet means; said rearward portion comprising a second plate substantially transversely disposed to the longitudinal axis of said body member and having a second radially outer inwardly extending flange member engageable with said first radially outer inwardly extending flange member; a second radially outer outwardly extending circumferential flange member; a radially inner outwardly extending outlet means; said outlet means being externally threaded to provide a second hose coupling means, said second circumferential flange member extending outwardly from said second plate a distance at least equal to the outward extent of said outlet means; a perforated cylindrical member defining with said body member an annular chamber, said perforated cylindrical member being axially aligned with said inlet and outlet means; and removably attached closure means for said first and second coupling means.

2. The container of claim 1 wherein said chamber is provided with support means to maintain said perforated cylindrical member in axial alignment with said inlet and outlet means.

3. The container of claim 1 wherein said first and second radially outer inwardly extending flange members are internally and externally threaded, respectively.

References Cited
UNITED STATES PATENTS

| | | | |
|---|---|---|---|
| 1,170,908 | 2/1916 | Houghton | 23—267 |
| 1,936,275 | 11/1933 | Siebert | 23—267 |
| 2,337,149 | 12/1943 | Bullock | 23—267 |
| 2,557,557 | 6/1951 | Newcum | 23—272 X |
| 2,667,663 | 2/1954 | Blasczyk | 23—267 X |
| 2,723,905 | 11/1955 | Coakley | 23—272 |
| 3,083,916 | 4/1963 | Neel | 239—315 |

NORMAN YUDKOFF, *Primary Examiner.*

WILBUR L. BASCOMB, Jr., *Examiner.*

S. J. EMERY, *Assistant Examiner.*